United States Patent Office 3,188,326
Patented June 8, 1965

3,188,326
2-METHYL DERIVATIVES OF Δ²-ANDROSTEN-17β-OL
Albert Bowers, John Edwards, and James C. Orr, all of Mexico City, Mexico, assignors, by mesne assignments, to Syntex Corporation, a corporation of Panama
No Drawing. Filed Oct. 20, 1961, Ser. No. 146,453
Claims priority, application Mexico, Apr. 4, 1961, 62,219
19 Claims. (Cl. 260—397.5)

The present invention relates to certain new cyclopentanoperhydrophenanthrene derivatives and to a method for the preparation of the same.

More particularly, our invention relates to the novel 2-methyl derivatives of Δ²-androsten-17β-ol, which may further possess a 17α-alkyl, alkenyl or alkynyl group, and also comprises the preparation of esters of such compounds and their corresponding 19-nor analogs.

These novel compounds are powerful anabolic agents having a favorable anabolic-androgenic ratio, they help to increase the protein metabolism and the deposition of calcium in the bone tissue; they further show anti-estrogenic activity, lower the cholesterol level in the blood and inhibit the secretion of gonadotrophins by the pituitary gland.

The 17α-alkenyl and 17α-alkynyl compounds further exhibit progestational activity.

The novel compounds object of our invention are represented by the following formula:

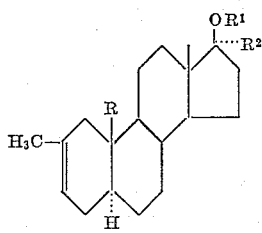

In the above formula R represents hydrogen or methyl, $R^1$ represents hydrogen or an acyl group derived from a carboxylic acid of 1 to 12 carbon atoms; $R^2$ represents hydrogen, a lower alkyl, alkenyl or alkynyl group, such as methyl, ethyl, propyl, vinyl, ethynyl or propynyl.

The acyl groups referred to above derive from carboxylic acids of less than 12 carbon atoms, saturated or unsaturated, of straight, branched, cyclic or mixed aliphatic-cyclic chain, substituted or not with hydroxyl, methoxy, amino, halogen or other groups; typical such esters are the acetate, propionate, butyrate, valerate, hemisuccinate, enanthate, caproate, benzoate, undecenoate, trimethylacetate, phenoxyacetate, cyclopentylpropionate and β-chloropropionate.

The novel compounds object of the present invention are obtained from an ester of 2α-methyl-dihydroallotestosterone or from an ester of 2α-methyl-19-nor-dihydroallotestosterone, by the method illustrated by the following series of reactions:

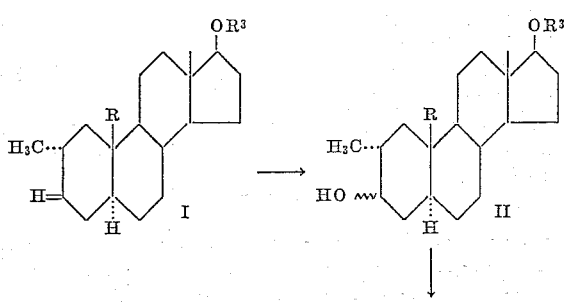

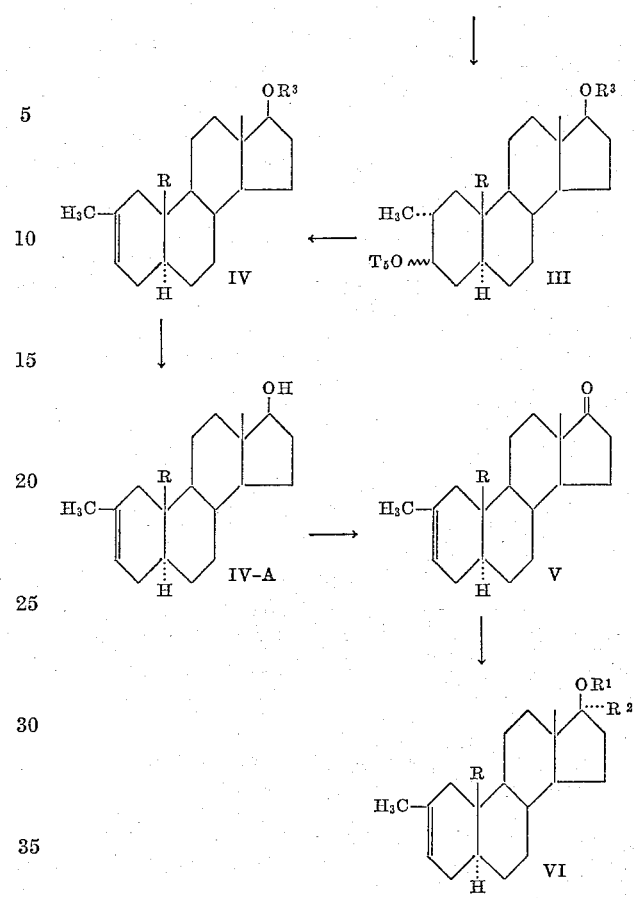

In the above formulas R, $R^1$ and $R^2$ have the same meaning set forth previously. $R^3$ represents an acyl radical.

In practicing the process outlined above an ester of 2α-methyldihydroallotestosterone or 2α-methyl-19-nor-dihydroallotestosterone, such as the acetate or propionate, is reduced with a double metal hydride, preferably with sodium borohydride, at room temperature and for a period of time between 3 and 12 hours, using an organic solvent inert to the reaction, such as dioxane, methanol or tetrahydrofuran, to produce a mixture of 3α and 3β-hydroxy compounds (II), where the 3β-isomer predominated; this mixture is treated with tosyl chloride in pyridine solution to form a mixture of 3α and 3β-tosylates, i.e., a 17-ester of 2α-methyl-3-tosyloxy-androstan-17β-ol and 2α-methyl-3-tosyloxy-19-nor-androstan-17β-ol (III).

By refluxing the above tosylates with a tertiary amine, such as collidine, lutidine or pyridine, there is eliminated the tosyloxy group with simultaneous formation of a double bond at C–2, 3, thus obtaining an ester of 2-methyl-Δ²-androsten-17β-ol or its 19-nor analog (IV), which are converted into the corresponding free compounds by saponification with methanolic potassium hydroxide (IV–A).

By oxidation of 2-methyl-Δ²-androsten-17β-ol or its 19-nor analog with chromic acid in acetone in sulfuric acid medium, or with chromic acid in acetic acid solution, there are obtained the corresponding ketones (V), i.e. 2-methyl-Δ²-androsten-17-one and 2-methyl-Δ²-19-nor-androsten-17-one.

For obtaining the 17α-alkyl, alkenyl or alkynyl derivatives (VI), 2-methyl-Δ²-androsten-17-one or its 19-nor-analog are treated with an organometallic halide at the reflux temperature for 3 to 5 hours, or at room temperature for a longer time. Adequate solvents for this reaction are the aromatic hydrocarbons such as benzene, toluene or xylene, or other organic solvents inert to the reaction, such as ether or tetrahydrofuran; in this manner the 17-keto group is converted into the 17β-hydroxy-17α-alkyl, 17β-hydroxy-17α-alkenyl or 17β-hydroxy - 17α - alkynyl grouping, according to the Grignard reagent employed for the reaction. Thus, for example, by treating 2-methyl-Δ$^2$ - androsten-17-one with methyl magnesium bromide there is obtained 2,17α-dimethyl-Δ$^2$-androsten-17β-ol.

Alternatively, the 2-methyl-17α-alkyl-Δ$^2$-17β-hydroxy-androstenes, as well as their 19-nor analogs, may be obtained by treating the 17-ketones with an alkyl lithium. The 17α-alkynyl compounds are obtained by treating the 17-ketones with sodium or potassium acetylide or with the sodium or potassium salt of another alkyne.

By reacting 2-methyl-Δ$^2$-androsten-17β-ol and 2-methyl-Δ$^2$-19-nor-androstan-17β-ol with anhydrides or chlorides of acids of up to 12 carbon atoms in pyridine solution there are obtained the respective esters. The esters of the 17α-alkyl, alkenyl and alkynyl substituted derivatives are obtained by treating the free compound with anhydrides or chlorides of the acids set forth above, in benzene solution and in the presence of p-toluenesulfonic acid.

The following specific examples serve to illustrate but are not intended to limit the present invention.

*Example I*

To a solution of 10 g. of the propionate of 2α-methyl-dihydroallotestosterone, described by H. J. Ringold et al. in J. Am. Chem. Soc., 81, 427 (1959), in 100 cc. of dioxane was added a solution of 5 g. of sodium borohydride in 10 cc. of water and 40 cc. of dioxane and the mixture was kept at room temperature for 3 hours. There was then cautiously added 5 cc. of acetic acid to destroy the excess of reagent and water was added until complete precipitation of the product which was collected, washed and dried to produce a mixture of 2α-methyl-androstane-3α,17β - diol 17 - propionate and 2α-methyl-androstane-3β,17β-diol 17-propionate.

The above crude reduction product was dissolved in 40 cc. of pyridine, treated with 5 g. of tosyl chloride and the mixture was allowed to react overnight at room temperature; the resulting solution was poured into ice water and the precipitate formed was collected, thus giving 2α-methyl-androstane-3,17β-diol 3-tosylate-17-propionate (mixture of 3α and 3β isomers). By crystallization from acetone-hexane there was obtained 2α-methyl-androstane-3β,17β-diol 3-tosylate-17-propionate in pure form, M.P. 148–149° C. $[\alpha]_D$ —33° (chloroform).

A mixture of 5 g. of the above compound and 10 cc. of γ-collidine was refluxed under anhydrous conditions for 2 hours, cooled and poured into dilute hydrochloric acid. The product was repeatedly extracted with ether and the combined extract was washed with 10% hydrochloric acid solution until complete removal of the collidine, then with 10% sodium carbonate solution and finally with water to neutral, dried over anhydrous sodium sulfate and evaporated to dryness under vacuum. Crystallization of the residue from acetone yielded the propionate of 2-methyl-Δ$^2$-androsten-17β-ol, M.P. 116.5–118°, $[\alpha]_D$ +45.7° (chloroform).

A solution of 3 g. of the above compound in 100 cc. of methanol was treated with 1.5 g. of potassium hydroxide previously dissolved in 2 cc. of water and 10 cc. of methanol, and the mixture was refluxed for 2 hours; at the end of this time the mixture was neutralized with acetic acid, concentrated to a small volume and poured into ice cold salt water; the precipitate formed was collected, washed and dried, thus affording 2-methyl-Δ$^2$-androsten-17β-ol.

*Example II*

The method of the preceding example was repeated, but using the acetate of 2α-methyl-19-nor-dihydroallotestosterone as starting compound, thus producing successively a mixture of 2α-methyl-19-nor-androstan-3β,17β-diol 17-acetate and its 3α-isomer, then 2α-methyl-19-nor-androstan-3,17β-diol 3-tosylate-17-acetate, the acetate of 2-methyl-Δ$^2$-19-nor-androsten-17β-ol and finally 2-methyl-Δ$^2$-19-nor-androsten-17β-ol.

To a solution of 1 g. of 2-methyl-Δ$^2$-19-nor-androsten-17β-ol in 5 cc. of pyridine was added 1 cc. of benzoyl chloride and the mixture was heated on the steam bath for 1 hour and poured into water. The precipitate formed was collected and crystallized from chloroform-methanol, thus furnishing the benzoate of 2-methyl-Δ$^2$-19-nor-androsten-17β-ol.

The starting compound was obtained by following the method described by H. J. Ringold et al. in J. Am. Chem. Soc., 81, 427 (1959), starting from 19-nor dihydroallotestosterone, which was condensed with ethyl orthoformate in the presence of sodium hydride to produce the 2-hydroxymethylene derivative, which on hydrogenation in the presence of palladium on charcoal in methanol as solvent afforded 2α-methyl-19-nor-androstan-17β-ol. Acetylation of this compound by conventional methods gave the acetate of 2α-methyl-19-nor-dihydroallotestosterone.

*Example III*

A solution of 1 g. of 2-methyl-Δ$^2$-androsten-17β-ol in 5 cc. of pyridine was treated with 2 cc. of acetic anhydride and the mixture was kept overnight at room temperature and then poured into ice water; the precipitate formed was collected, thus giving the acetate of 2-methyl-Δ$^2$-androsten-17β-ol.

In the same manner, but using caproic, undecenoic, and cyclopentylpropionic anhydrides as esterifying agents, there were obtained the caproate, undecenoate and cyclopentylpropionate of 2-methyl-Δ$^2$-androsten-17β-ol and of 2α-methyl-Δ$^2$-19-nor-androsten-17β-ol.

*Example IV*

A stirred solution of 5 g. of 2-methyl-Δ$^2$-androsten-17β-ol in 150 cc. of acetone was cooled to 0° C. and treated dropwise with an 8 N solution of chromic acid in 23% sulfuric acid, until the color of chromium trioxide persisted in the mixture. It was then kept at 5–10° C. for 10 minutes, poured into ice water and the precipitate formed was collected. By crystallization from acetone-hexane there was obtained 2-methyl-Δ$^2$-androsten-17-one.

A solution of 5 g. of 2-methyl-Δ$^2$-androsten-17-one in 100 cc. of anhydrous benzene free of thiophene was slowly added to 25 cc. of 4 N solution of methyl magnesium bromide in ether and the mixture was refluxed under anhydrous conditions for 3 hours, cooled and cautiously poured into ice water; after acidifying with hydrochloric acid the benzene layer was separated and the aqueous phase was extracted several times with ethyl acetate; the combined organic extract was washed to neutral, the solution was dried over anhydrous sodium sulfate and evaporated to dryness under reduced pressure. Crystallization of the residue from acetone yielded 2,17α-dimethyl-Δ$^2$-androsten-17β-ol.

A mixture of 1 g. of the above compound, 40 cc. of acetic acid, 20 cc. of acetic anhydride and 1 g. of p-toluenesulfonic acid was kept at room temperature for 1 hour, poured into water and heated on the steam bath for 30 minutes to hydrolyze the excess of reagent; the precipitate formed was collected and washed with water to neutral, thus furnishing the acetate of 2,17α-dimethyl-Δ$^2$-androsten-17β-ol.

*Example V*

By following the method of the preceding example, but using ethyl-magnesium bromide and propyl magnesium bromide as alkylating agents, 2-methyl-Δ$^2$-androsten-17- one was respectively converted into 2-methyl-17α-ethyl-Δ²-androsten-17β-ol and 2-methyl-17α-propyl-Δ²-androsten-17β-ol. Subsequent acetylation of these compounds with a mixture of acetic acid and acetic anhydride in the presence of p-toluenesulfonic acid gave the corresponding acetates.

Example VI

A solution of 5 g. of 2-methyl-Δ²-androsten-17-one in 150 cc. of anhydrous ether was added dropwise to a solution and propargyl magnesium bromide (prepared from 6.8 g. of propargyl bromide, 1.4 g. of magnesium and 200 cc. of ether). The mixture was refluxed under stirring for 5 hours, cooled and poured into 500 cc. of 5% ammonium chloride solution; the ether layer was separated, washed with water to neutral, dried over anhydrous sodium sulfate and evaporated to dryness under vacuum. Crystallization of the residue from methanol furnished 2-methyl-17α-propargyl-Δ²-androsten-17β-ol.

1 g. of the above compound was dissolved in 20 cc. of benzene and treated with 2 cc. of propionic anhydride and 0.5 g. of p-toluenesulfonic acid. The mixture was kept at room temperature overnight, then diluted with water, stirred for 30 minutes to hydrolyze the excess of reagent and the benzene layer was separated, washed with 5% sodium carbonate solution and finally with water to neutral, dried over anhydrous sodium sulfate and evaporated to dryness under vacuum. Chromatography of the residue on washed alumina, followed by crystallization of the solid fractions from acetone-hexane afforded the propionate of 2-methyl-17α-propargyl-Δ²-androsten-17-β-ol.

Example VII

A stirred solution of 10 g. of 2-methyl-Δ²-19-nor-androsten-17β-ol, obtained as described in Example II, in 100 cc. of acetic acid was treated dropwise with a solution of 2.8 g. of chromic acid (1.1 equivalents) in 40 cc. of 80% acetic acid, at a temperature between 15 and 20° C. The mixture was kept for 1 hour at room temperature, poured into ice cold salt water and the precipitate formed was collected by filtration, and washed with water to neutral, thus yielding 2-methyl-Δ²-19-nor-androsten-17-one, which was purified by crystallization from chloroform-methanol.

5 g. of the above compound was treated with methyl magnesium bromide, by following the method of Example IV, to give 2,17α-dimethyl-Δ²-19-nor-androsten-17β-ol.

Example VIII

By following the method of Example IV, but using vinyl, ethynyl or propargyl magnesium bromide, 2-methyl-Δ²-19-nor-androsten-17-one was respectively converted into 2-methyl-17α-vinyl-Δ²-19-nor-androsten-17β-ol, 2-methyl-17α-ethynyl-Δ²-19-nor-androsten - 17β-ol and 2-methyl-17α-propargyl-Δ²-19-nor-androsten-17β-ol.

Example IX

A solution of 2 g. of 2-methyl-Δ²-androsten-17-one in 60 cc. of anhydrous benzene was added under an atmosphere of nitrogen to a solution of potassium ter-amylate previously prepared from 1.4 g. of potassium and 30 cc. of ter-amyl alcohol. Into the resulting mixture there was introduced a slow stream of purified acetylene for 40 hours and then the solution was poured into ice water and extracted several times with benzene. The combined extract was washed to neutral, the organic layer was dried over anhydrous sodium sulfate and the solvent evaporated under vacuum. The residue was chromatographed on 50 times its weight of washed alumina and the solid fractions were recrystallized from acetone-hexane, thus yielding 2-methyl-17α-ethynyl-Δ²-androsten-17β-ol.

Example X

A stirred suspension of 1.6 g. of 2-methyl-Δ²-androsten-17-one in 30 cc. of anhydrous ether was added to a solution of butyl-lithium previously prepared from 11.5 cc. of 1-bromobutane and 0.67 g. of lithium in 60 cc. of ether. The mixture was stirred for 6 hours at room temperature under an atmosphere of nitrogen, then diluted with water, acidified with hydrochloric acid and stirred for 1 hour more; the ether layer was separated, washed to neutral, dried over anhydrous sodium sulfate and evaporated to dryness. Chromatography of the residue furnished 2-methyl-17α-butyl-Δ²-androsten-17β-ol.

The above compound was treated with propionic anhydride in benzene solution and in the presence of p-toluenesulfonic acid, in accordance with the method of Example VI, to produce the propionate of 2-methyl-17α-butyl-Δ²-androsten-17β-ol.

Example XI

In accordance with the method of esterification described in Example VI, 1 g. of 2,17α-dimethyl-Δ²-androsten-17β-ol was converted into the corresponding propionate.

In a similar manner, but using caproic and undecenoic anhydrides as esterifying agents, there were obtained the caproate and undecenoate of 2,17α-dimethyl-Δ²-androsten-17β-ol.

Example XII 2 g. of 2-methyl-Δ²-19-nor-androsten-17-one was converted into 2-methyl-17α-ethynyl-Δ²-19-nor-androsten-17β-ol by following the method of Example IX. Subsequent esterification of this compound with a mixture of acetic acid and acetic anhydride in the presence of p-toluenesulfonic acid, in accordance with the method of Example IV produced the acetate of 2-methyl-17α-ethynyl-Δ²-19-nor-androsten-17β-ol.

Example XIII

A solution of 1 g. of 2-methyl-Δ²-androsten-17-one in 40 cc. of anhydrous ether was slowly added to 25 cc. of a 4 N ether solution of vinyl magnesium bromide and the mixture was stirred at room temperature under anhydrous conditions for 24 hours; at the end of this time it was cautiously poured into ice water and acidified with hydrochloric acid; the organic layer was separated, washed to neutral, dried over anhydrous sodium sulfate and evaporated to dryness. The residue was chromatographed on 30 times its weight of washed aluma, thus furnishing 2-methyl-17α-vinyl-Δ²-androsten-17β-ol.

Example XIV

A mixture of 500 mg. of 2-methyl-17α-ethynyl-Δ²-androsten-17β-ol, prepared in Example IX, 25 cc. of benzene, 2 cc. of cyclopentylpropionic anhydride and 250 mg. of p-toluenesulfonic acid was kept at room temperature for 48 hours, then diluted with water and stirred for 30 minutes to hydrolyze the excess of reagent. The benzene layer was separated, washed to neutral, dried over anhydrous sodium sulfate and evaporated to dryness. By crystallization of the residue from acetone-ether there was obtained the cyclopentylpropionate of 2-methyl-17α-ethynyl-Δ²-androsten-17β-ol.

We claim:
1. A compound of the following formula:

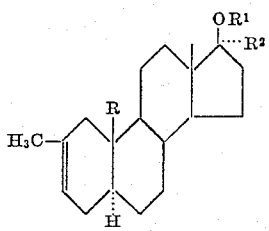

wherein R is selected from the group consisting of hydrogen and methyl; $R^1$ is selected from the group consisting of hydrogen and a hydrocarbon carboxylic acyl group of less than 12 carbon atoms and $R^2$ is selected from the group consisting of hydrogen, lower alkyl, lower alkenyl and lower alkynyl.

2. 2-methyl-$\Delta^2$-androsten-17$\beta$-ol.
3. The propionate of 2-methyl-$\Delta^2$-androsten-17$\beta$-ol.
4. 2-methyl-$\Delta^2$-19-nor-androsten-17$\beta$-ol.
5. The hydrocarbon carboxylic acid esters of less than 12 carbon atoms of 2-methyl-$\Delta^2$-androsten-17$\beta$-ol.
6. The hydrocarbon carboxylic acid esters of less than 12 carbon atoms of 2-methyl-$\Delta^2$-19-nor-androsten-17$\beta$-ol.
7. 2-methyl-17$\alpha$-lower alkyl-$\Delta^2$-androsten-17$\beta$-ol.
8. 2,17$\alpha$-dimethyl-$\Delta^2$-androsten-17$\beta$-ol.
9. The hydrocarbon carboxylic acid esters of less than 12 carbon atoms of 2-methyl-17$\alpha$-lower alkyl-$\Delta^2$-androsten-17$\beta$-ol.
10. 2-methyl-17$\alpha$-lower alkenyl-$\Delta^2$-androsten-17$\beta$-ol.
11. 2-methyl-17$\alpha$-vinyl-$\Delta^2$-androsten-17$\beta$-ol.
12. 2-methyl-17$\alpha$-lower alkynyl-$\Delta^2$-androsten-17$\beta$-ol.
13. 2-methyl-17$\alpha$-ethynyl-$\Delta^2$-androsten-17$\beta$-ol.
14. 2-methyl-17$\alpha$-propargyl-$\Delta^2$-androsten-17$\beta$-ol.
15. 2-methyl-17$\alpha$-lower alkyl-$\Delta^2$-19 - nor - androsten-17$\beta$-ol.
16. 2-methyl - 17$\alpha$-lower alkenyl-$\Delta^2$-19-nor-androsten-17$\beta$-ol.
17. 2-methyl - 17$\alpha$-lower alkynyl-$\Delta^2$-19-nor-androsten-17$\beta$-ol.
18. 2-methyl-17$\alpha$-ethynyl-$\Delta^2$-19-nor-androsten-17$\beta$-ol.
19. A process for preparing a compound of the following formula:

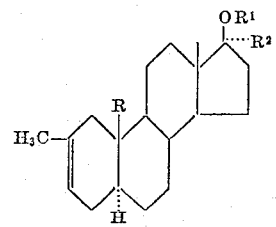

wherein R is selected from the group consisting of hydrogen and methyl; $R^1$ is selected from the group consisting of hydrogen and a hydrocarbon carboxylic acyl group of less than 12 carbon atoms and $R^2$ is selected from the group consisting of hydrogen, lower alkyl, lower alkenyl and lower alkynyl comprising reacting the corresponding 2$\alpha$-methyl-17$\beta$-acyloxy-androstane - 3,17$\beta$-diol with tosyl chloride, treating the thus formed 3-tosylate with a tertiary amine to produce the corresponding 17$\beta$-acyloxy-2-methyl-$\Delta^2$-androsten-17$\beta$-ol, saponifying the acyloxy group, oxidizing the thus formed corresponding 2-methyl-$\Delta^2$-androsten-17$\beta$-ol with chromic acid and reacting the thus formed 17-ketone with a member of the group selected from an aliphatic hydrocarbon magnesium halide, a lower alkyl alkali metal and a lower alkyne alkali metal salt.

References Cited by the Examiner
UNITED STATES PATENTS 2,996,524  8/61  Huffman _____ 260—397.5

OTHER REFERENCES

Fieser et al., Steroids (1959), pages 692–96, Reinhold Pub. Co., New York.

LEWIS GOTTS, *Primary Examiner.*

M. LIEBMAN, IRVING MARCUS, *Examiners.*